United States Patent
Ballaire (12)

(10) Patent No.: US 11,047,107 B2
(45) Date of Patent: Jun. 29, 2021

(54) UTILITY VEHICLE HAVING A FRONT LOADER

(71) Applicant: DEERE & COMPANY, Moline, IL (US)

(72) Inventor: Frederic Ballaire, Neustadt an der Weinstrasse (DE)

(73) Assignee: DEERE & COMPANY, Moline, IL (US)

( * ) Notice: Subject to any disclaimer, the term of this patent is extended or adjusted under 35 U.S.C. 154(b) by 88 days.

(21) Appl. No.: 16/390,469

(22) Filed: Apr. 22, 2019

(65) Prior Publication Data

US 2019/0338488 A1    Nov. 7, 2019

(30) Foreign Application Priority Data

May 2, 2018   (DE) .......................... 102018206748.1

(51) Int. Cl.
*E02F 3/42* (2006.01)
*E02F 3/28* (2006.01)
(Continued)

(52) U.S. Cl.
CPC .............. *E02F 3/422* (2013.01); *E02F 3/283* (2013.01); *E02F 3/3695* (2013.01); *E02F 3/431* (2013.01);
(Continued)

(58) Field of Classification Search
CPC ... E02F 3/283; E02F 3/422; F15B 2211/3127; F15B 2211/3133; F15B 2211/7741; F15B 13/021
See application file for complete search history.

(56) References Cited

U.S. PATENT DOCUMENTS

| 3,438,307 | A | * | 4/1969 | Ahlenius | ............... | F15B 13/021 |
|-----------|---|---|--------|----------|-----|-----|
| | | | | | | 91/436 |
| 5,251,705 | A | * | 10/1993 | Waggoner | ............. | E02F 9/2203 |
| | | | | | | 172/812 |
| 9,429,174 | B1 | | 8/2016 | Schuh et al. | | |

FOREIGN PATENT DOCUMENTS

| DE | 3709504 A1 | 10/1988 |
|----|-----------|---------|
| DE | 10150679 A1 | 4/2003 |

(Continued)

OTHER PUBLICATIONS

European Search Report issued in counterpart application No. 19169895.0 dated Aug. 19, 2019. (6 pages).

*Primary Examiner* — Abiy Teka
(74) *Attorney, Agent, or Firm* — Taft Stettinius & Hollister LLP; Stephen F. Rost

(57) ABSTRACT

A utility vehicle having a front loader includes an installation base for mounting the front loader on the utility vehicle. The vehicle includes a swing arm arranged in an articulated manner on the installation base and a swing arm cylinder supported on the installation base and on the swing arm. The swing arm cylinder has two hydraulic connections via which the swing arm cylinder is connected to working connections of a hydraulic controller. A hydraulic switching arrangement includes different switching positions connected between the two hydraulic connections of the swing arm cylinder and the hydraulic controller such that in a short-circuited switching position of the switching arrangement. The two hydraulic connections of the swing arm cylinder are hydraulically connected to one another, and in a separated switching position of the switching arrangement, the two hydraulic connections of the swing arm cylinder are hydraulically separated from one another.

18 Claims, 4 Drawing Sheets

(51) Int. Cl.
    *E02F 3/36*      (2006.01)
    *E02F 3/43*      (2006.01)
    *E02F 9/22*      (2006.01)
    *B62D 49/02*    (2006.01)
    *B62D 49/06*    (2006.01)

(52) U.S. Cl.
    CPC .......... *E02F 9/2225* (2013.01); *E02F 9/2267* (2013.01); *E02F 9/2271* (2013.01); *B62D 49/02* (2013.01); *B62D 49/065* (2013.01)

(56) References Cited

FOREIGN PATENT DOCUMENTS

| FR | 3048467 A1 | 9/2017 |
|----|------------|--------|
| WO | 2007022546 A1 | 2/2007 |

\* cited by examiner

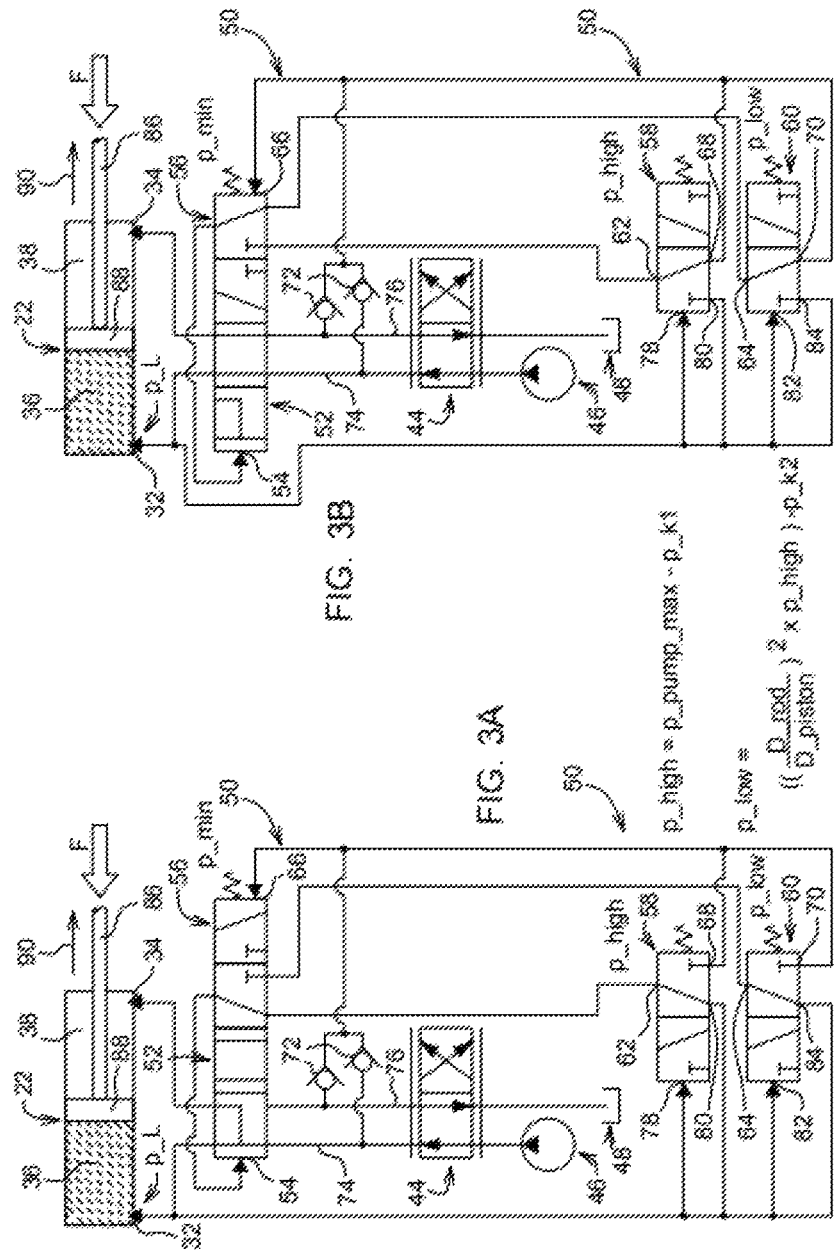

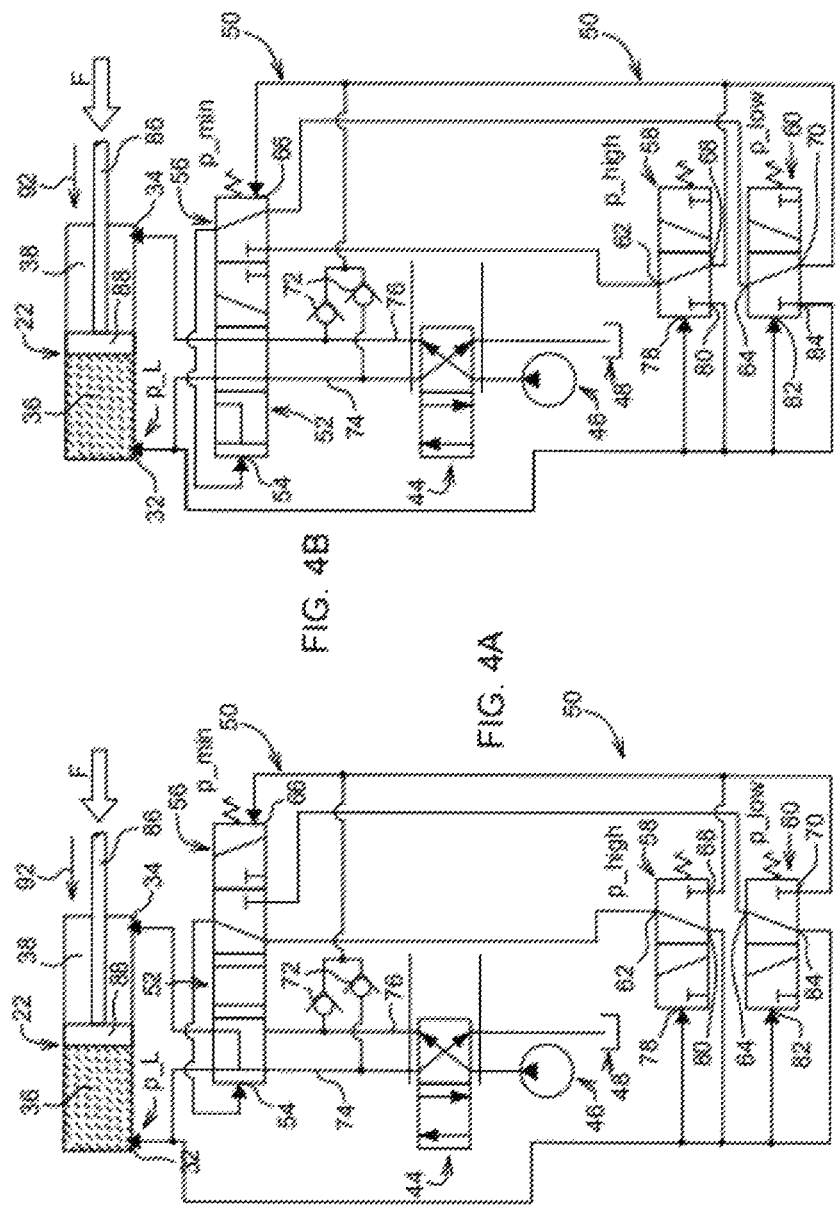

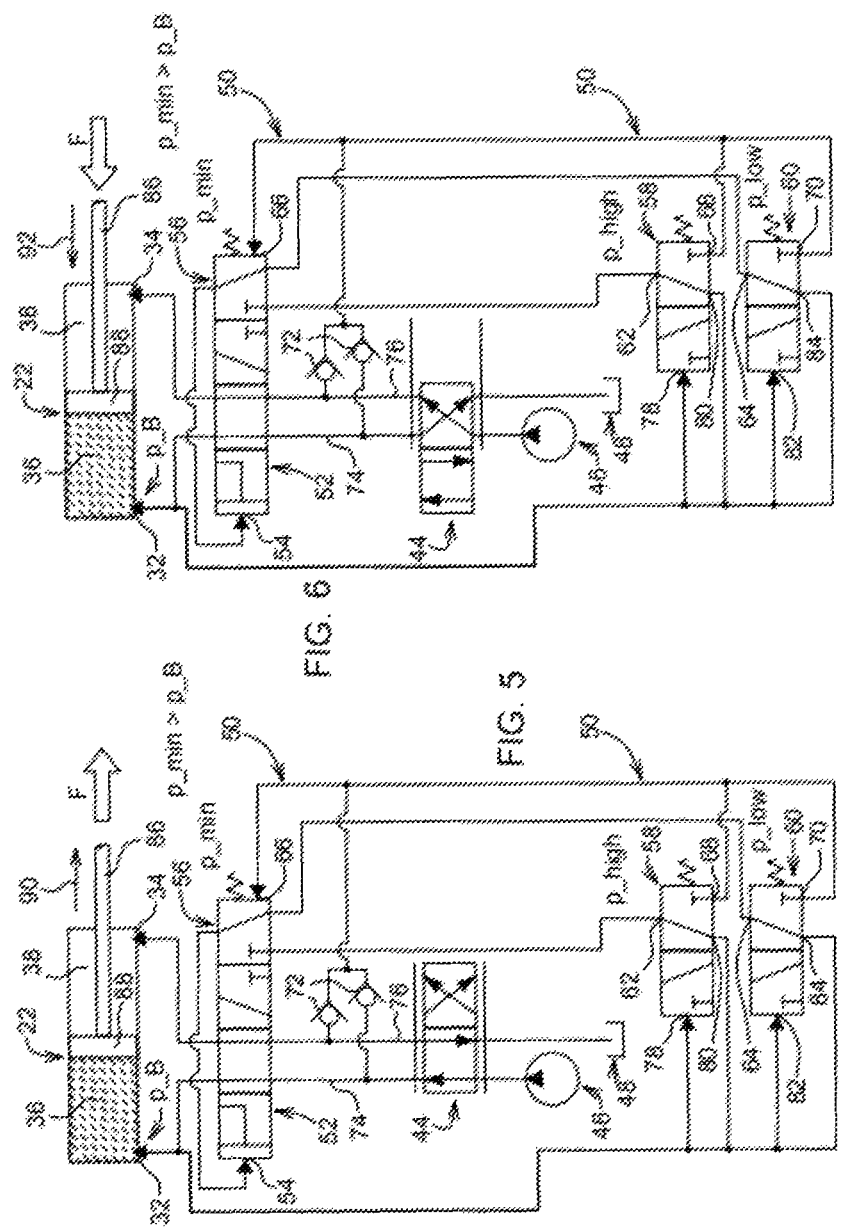

UTILITY VEHICLE HAVING A FRONT LOADER

RELATED APPLICATIONS

This application claims priority to German Patent Application Ser. No. 102018206748.1, filed May 2, 2018, the disclosure of which is hereby incorporated by reference in its entirety.

FIELD OF THE DISCLOSURE

The present disclosure relates to a utility vehicle having a front loader mounted by an installation base on the utility vehicle and has a swing arm articulated the installation base.

BACKGROUND

Vehicles having front loaders of this kind are used, for example, in agriculture or in municipal service for lifting or moving loads. A hydraulic swing arm cylinder arranged between the installation base and the swing arm supports the lifting and lowering movements of the swing arm. There is a need, however, for improving the movement processes of the front loader.

SUMMARY

In the present disclosure, a utility vehicle comprises a front loader having an installation base for mounting on the utility vehicle, more particularly on a support structure of the utility vehicle. The front loader contains a swing arm arranged in an articulated manner on the installation base, as well as a swing-arm cylinder supported on the installation base and on the swing arm. The swing arm cylinder is constructed as a double-acting lifting cylinder having two hydraulic connections. The swing arm cylinder is connected via the two hydraulic connections to working connections of a hydraulic controller (e.g., a hydraulic valve section, a proportional valve, or a 4/2 directional valve). The hydraulic controller is in turn connected to a hydraulic pump and a hydraulic tank or sump containing a hydraulic medium (e.g., oil). A hydraulic switching arrangement is connected or interposed between the two hydraulic connections of the swing arm cylinder and the hydraulic controller. The switching arrangement can assume different switching positions such that, in a short-circuited switching position of the switching arrangement, the two hydraulic connections of the swing arm cylinder are connected hydraulically to one another and, in a separated switching position of the switching arrangement, the two hydraulic connections of the swing arm cylinder are hydraulically disconnected from one another.

This hydraulic switching arrangement makes it possible that, during the operating processes of the front loader, namely in the short-circuited switching position, the two cylinder chambers of the swing arm cylinder can be hydraulically connected to one another. In this way, the hydraulic volume to be transported between the pump and the swing arm cylinder during the working operation of the swing arm cylinder can be markedly reduced. For example, it is already sufficient during extension of the swing arm cylinder if the pump delivers a hydraulic volume that corresponds to the volume of the piston rod moved out of the cylinder pipe. The reduced hydraulic flow allows higher movement speeds of the swing arm cylinder during the operating processes of the front loader.

The switching arrangement with the separated switching position also takes account of the fact that the hydraulic connections of the swing arm cylinder can be promptly disconnected from one another under certain hydraulic conditions—when a defined load pressure is reached or exceeded for example—in order to then achieve a conventional operation of the swing arm cylinder.

It is therefore possible to optimize individual movement processes of the front loader with the hydraulic switching arrangement. The technical means for this remain simple and cost-effective, because the switching arrangement is connected hydraulically to the swing arm cylinder and the pump. In particular, additional hydraulic lines or an adaptation of a control electronics unit are not required. The switching arrangement can therefore be configured as a cost-effective hydraulic switching circuit. The switching arrangement can consequently also be used as a cost-effective and easy-to-install retrofit solution in a utility vehicle.

The utility vehicle may be an agricultural vehicle such as a tractor, or a utility vehicle for municipal landscaping or road work.

In another embodiment, the switching arrangement assumes its separated switching position proceeding from the short-circuited switching position whenever a defined upper limit load pressure of the swing arm cylinder is reached or exceeded with increasing load pressure of the swing arm cylinder. This takes account of the fact that the maximum force of the swing arm cylinder (e.g., for lifting loads) is less in the short-circuited switching position than in conventional operation with separate hydraulic connections of the two cylinder chambers for the swing arm cylinder. The cause for this is that the piston rod cross-sectional area, as the effective surface area for building up force, is smaller in comparison to the piston cross-sectional area. In order to provide larger forces, the switching arrangement automatically switches to the separated switching position on the basis of a detected upper limit load pressure and enables conventional operation of two hydraulically separated cylinder chambers of the swing arm cylinder.

A particularly economical switching behavior of the switching arrangement from the short-circuited switching position to the separated switching position can be achieved if the defined upper limit load pressure of the swing arm cylinder corresponds to a maximum working pressure of the pump minus a pressure constant. The maximum working pressure of the pump is 200 bar, for example. The above-mentioned pressure constant can have a value from 1 bar to 8 bar, for example. By taking into account the above-mentioned pressure constants, it is particularly easy to guarantee that the switching arrangement is in the separated switching position at maximum pump pressure on the swing arm cylinder. In this way, movement processes of the front loader can be kept interruption-free in a technically simple manner because the switchover from the short-circuited position to the separated switching position takes place even before the maximum working pressure of the pump has been reached.

It may also be desirable if, when the load pressure on the swing arm cylinder is decreasing, the switching arrangement assumes its short-circuited position upon reaching or falling below a defined lower limit load pressure of the swing arm cylinder and if this lower limit load pressure is less than the upper limit load pressure. This enables a reasonable hydraulic hysteresis of the switching arrangement for stable switching behavior between the separated switching position and the short-circuited switching position.

A stable switching behavior of the switching arrangement, with a sufficiently large hydraulic hysteresis, is supported by defining the defined lower limit load pressure by the equation $$p\_low = ((D\_rod/D\_piston)^2 \cdot p\_high) - p\_k2,$$

where p_low is the defined lower limit load pressure, D_rod is the diameter of a piston rod of the swing arm cylinder, D_piston is the diameter of a piston of the swing arm cylinder, p_high is the defined upper limit load pressure and p_k2 is a pressure constant.

The pressure constant p_k2 may have, for example, a value of from 1 bar to 8 bar.

In a further embodiment, the switching arrangement contains a switching valve unit (of a directional valve type, for example) that can be changed over between the short-circuited switching position and the separated switching position and has a hydraulic control input, the hydraulic pressure of which acts against a restoring pressure (e.g., a restoring spring) of the switching valve unit. In this way, it is possible to use standardized and cost-effectively available means for implementing the switching behavior of the switching arrangement.

For a technically simple actuation of the switching valve unit for changing over from the short-circuited switching position to the separated switching position, an upper pressure compensator that can be switched between different switching positions is provided. This upper pressure compensator is connected at a control input to the one hydraulic connection of the swing arm cylinder. In addition, an output connection of the upper pressure compensator can be connected to the control input of the switching valve unit, depending on specific hydraulic conditions. In this case, a restoring force, which corresponds to the defined upper limit load pressure p_high of the swing arm cylinder, acts against the control input of the upper pressure compensator. The upper pressure compensator thus supports the desired switching behavior of the switching arrangement upon reaching or exceeding the defined upper limit load pressure.

To support a hydraulically uncomplicated operation of the upper pressure compensator, it is advantageous if the control input thereof is hydraulically connected to an input connection of this pressure compensator and additionally the input connection can be hydraulically connectable to the output connection of this pressure compensator, depending on the switching position of this pressure compensator. In this way, the current load pressure at the swing arm cylinder can be used directly to control both the upper pressure compensator and the switching valve unit with respect to the desired switching functionality.

The switching arrangement may include a lower pressure compensator having a control input that is hydraulically connected to the one hydraulic connection of the swing arm cylinder. In addition, a restoring force, which corresponds to the defined lower limit load pressure p_low of the swing arm cylinder, acts against this control input. Furthermore, an output connection of the lower pressure compensator can be hydraulically connected to the control input of the switching valve unit depending on hydraulic boundary conditions. A lower pressure compensator designed and dimensioned in this way creates the prerequisite for a hydraulically simple implementation of the desired switching behavior of the switching arrangement under a decreasing load pressure at the swing arm cylinder.

To support a hydraulically uncomplicated operation of the lower pressure compensator, it is advantageous if the control input thereof is hydraulically connected to an input connection of this pressure compensator and the input connection can additionally be connected to the output connection of this pressure compensator, depending on the switching position of this pressure compensator. Thereby, the current load pressure at the swing arm cylinder can be used directly to control both the lower pressure compensator and the switching valve unit with respect to the desired switching functionality.

In a further embodiment, the switching arrangement contains a switchable auxiliary valve unit. Depending on the switching position, the auxiliary valve unit acts as a detachable hydraulic connection between the output connection of the upper pressure compensator or the output connection of the lower pressure compensator on the one hand, and the control input of the switching valve unit on the other. This auxiliary valve unit supports a hydraulically and technically simple actuation of the switching valve unit and thus a correspondingly uncomplicated structure of the switching arrangement when implementing the desired switching functionality.

A simple and cost-effective design of the switching arrangement with few components is further supported if the auxiliary valve unit is mechanically coupled to the switching valve unit and is subjected to a restoring force that acts as a restoring pressure p_min against the control input of the switching valve unit.

The restoring force acting against the control input of the switching valve unit is set to be larger than a possible back pressure of the swing arm cylinder. This dimensioning of the restoring force prevents the switching behavior of the switching valve unit, and thus movement sequences of the front loader, from being influenced in an undesired manner if, due to switching positions of hydraulic components of the switching arrangement, the back pressure is also present at the control input of the switching valve unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3a shows the circuit diagram according to FIG. 2 with a detailed representation of the switching arrangement in a short-circuited switching position during a lifting movement of the front loader, FIG. 3b shows the circuit diagram according to FIG. 3a with the switching arrangement in a separated switching position during a lifting movement of the front loader, FIG. 4a shows the circuit diagram according to FIG. 2 with a detailed representation of the switching arrangement in a short-circuited switching position during a lowering movement of the front loader, FIG. 4b shows the circuit diagram according to FIG. 4a with the switching arrangement in a separated switching position during a lowering movement of the front loader, FIG. 5 shows the circuit diagram according to FIG. 2 with a detailed representation of the switching arrangement in a separated switching position with an extended swing arm cylinder and for the operating situation of a force acting on the swing arm cylinder in the extension direction, which occasionally occurs, and FIG. 6 shows the circuit diagram according to FIG. 2 with a detailed representation of the switching arrangement in a separated switching position with retracted swing arm cylinder and back pressure occurring in the piston chamber of the swing arm cylinder.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
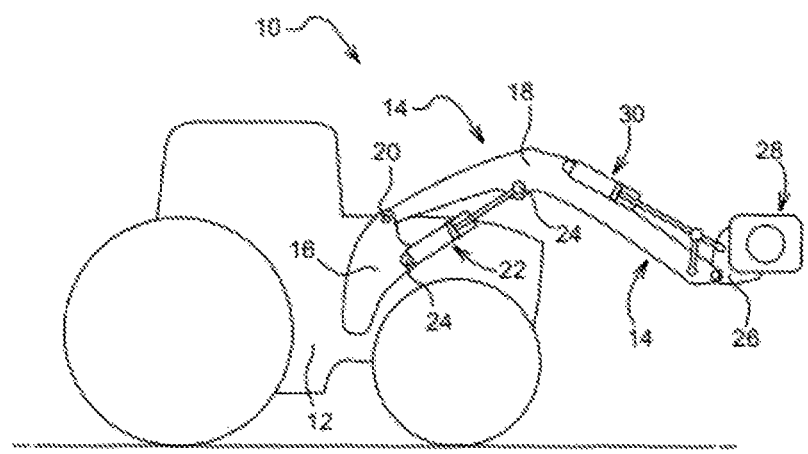
FIG. 1 shows a schematic side view of a tractor having a front loader.

FIG. 1 schematically shows a utility vehicle in the form of a tractor 10, on the supporting structure 12 of which a front loader 14 is reversibly mounted. The front loader 14 has an installation base 16, by means of which it is mounted on an attachment bracket of a tractor 10, for example. An angularly bent swing arm 18 is articulated to the installation base 16. The swing arm 18 is connected in an articulated manner by means of a base joint 20 and by means of a hydraulically operated swing arm cylinder 22 to the installation base 16. The swing arm cylinder 22 is supported by its two cylinder bearings 24 on the installation base 16 and the swing arm 18.

An implement carrier 26 is articulated to an area of the swing arm 18 remote from the installation base 16. The carrier is used in a conventional manner, not discussed in detail here, for receiving an implement (e.g., a bucket) which in turn supports a load 28 only shown schematically. An implement cylinder 30 for movement control of the implement carrier 26 is articulated in a conventional manner to the swing arm 18 and the implement carrier 26.

It should be noted that only visible components of the front loader 14 are described with reference to FIG. 1. Nevertheless, the front loader 14 has a second set of identical components, which are not visible and are arranged in parallel behind the visible components in the drawing plane according to FIG. 1, and jointly support an implement. The front loader 14 is mounted on either side of the engine compartment on the supporting structure 12, for example. The two swing arm cylinders 22 are hydraulically connected in parallel. The same applies to the two implement cylinders 30.

Figure 2:
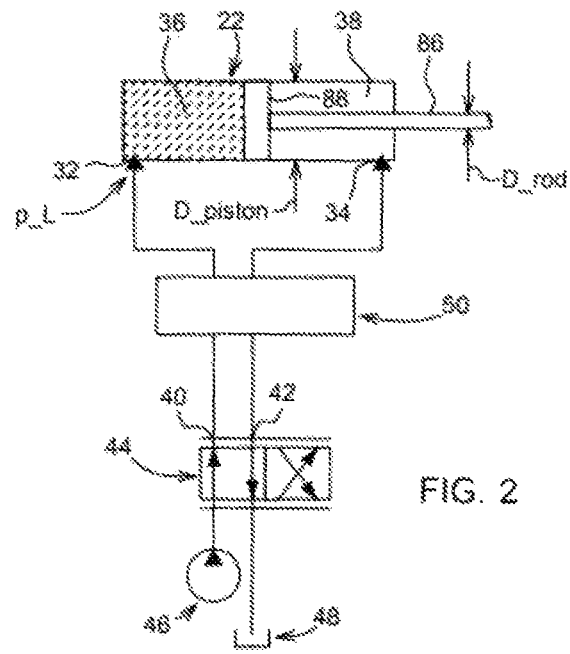
FIG. 2 shows a hydraulic circuit diagram with a schematically illustrated switching arrangement between a swing arm cylinder of the front loader and a hydraulic controller.

FIG. 2 shows the swing arm cylinder 22 as a double-acting lifting cylinder with two hydraulic connections 32, 34. The hydraulic connections 32, 34 are each associated with one of the two cylinder chambers of the swing arm cylinder 22. The hydraulic connection 32 is associated with a piston chamber 36 and the hydraulic connection 34 is associated with a rod chamber 38. The swing arm cylinder 22 is connected via the two hydraulic connections 32, 34 to working connections 40, 42 of a hydraulic controller 44 (e.g., a hydraulic valve section, a proportional valve, or 4/2-way directional valve). The hydraulic controller 44 is in turn connected in a conventional manner to a hydraulic pump 46 and a hydraulic tank 48 or sump containing a hydraulic medium (e.g., oil).

A hydraulic switching arrangement 50, the different switching positions of which influence the hydraulic actuation of the swing arm cylinder 22 in a manner yet to be explained, is arranged between the two hydraulic connections 32, 34 on the one hand and the pump 46 or the hydraulic controller 44 on the other.

The structure of the switching arrangement 50 will be described below with reference to FIG. 3a. The switching arrangement 50 contains a switching valve unit 52 that can be changed over between two different switching positions. In the short-circuited position of the switching valve unit 52 as shown in FIG. 3a, the two hydraulic connections 32, 34 of the swing arm cylinder 22 are short-circuited or hydraulically connected to one another. In a separated switching position (FIG. 3b) of the switching valve unit 52, the two hydraulic connections 32, 34 are separated hydraulically from one another.

The switching valve unit 52 has a control input 54, the hydraulic pressure of which is opposed by a restoring force of the switching valve unit 52 corresponding to a minimum restoring pressure p_min. This restoring pressure p_min is adjusted (in particular by means of a restoring spring) at an auxiliary valve unit 56 coupled to the switching valve unit 52. In this manner, the switching valve unit 52 is indirectly subjected to the minimum restoring pressure p_min. The restoring pressure p_min is dimensioned, among other things, such that an undesired short-circuited switching position of the switching arrangement 50 or the switching valve unit 52 is avoided in the operating situations shown in FIGS. 5 and 6.

The auxiliary valve unit 56 is designed as a 3/2-way directional valve. It acts independently of its switching position as a detachable hydraulic connection between the control input 54 of the switching valve unit 52 on the one hand and an upper pressure compensator 58 and a lower pressure compensator 60 on the other hand. An output connection 62 of the upper pressure compensator 58 and an output connection 64 of the lower pressure compensator 60 are each connected to a hydraulic connection of the auxiliary valve unit 56. Furthermore, the auxiliary valve unit 56 has a control input 66 on the restoring pressure side that is hydraulically connected to hydraulic connections 68 and 70, respectively, of the upper pressure compensator 58 and the lower pressure compensator 60. This control input 66 is also hydraulically connected via two (substantially leak-free) check valves 72 to two line sections 74, 76. The two line sections 74, 76 form the hydraulic connection between the controller 44 and the switching valve unit 52. By means of the check valve 72, the lower of the two hydraulic pressures in the hydraulic line sections 74, 76 is made available at the control input 66. This hydraulic pressure should be less than that in the piston chamber 36, specifically by at least the amount of p_min. In order to ensure this in the switching position of the hydraulic controller 44 and the auxiliary valve unit 56 according to FIG. 4a, for example, an orifice (not shown) can be integrated in the switching valve unit 52.

The upper pressure compensator 58 is designed as a 3/2-way directional valve and connected at a control input 78 to the hydraulic connection 32 of the swing arm cylinder 22. A restoring force (provided in particular by a restoring spring) leading to a restoring pressure acts against the control input 78 or the hydraulic pressure thereof and is dimensioned such that it corresponds to a defined upper limit load pressure p_high of the swing arm cylinder 22. An input connection 80 of the upper pressure compensator 58 is hydraulically connected to the control input 78 thereof. Depending on the switching position of the upper pressure compensator 58, the input connection 80 thereof and the output connection 62 can be hydraulically connected to one another.

The upper limit load pressure p_high is defined as a maximum working pressure (e.g., 200 bar) of the pump 46 minus a pressure constant p_k1 which is, for example, 1 bar or several bar, more particularly in a range between 3 bar to 8 bar.

Like the upper pressure compensator 58, the lower pressure compensator 60 is designed as a 3/2-way directional valve and connected at a control input 82 to the hydraulic connection 32 of the swing arm cylinder 22. A restoring force (provided, for example, by a restoring spring) leading to a restoring pressure acts against the control input 82 or the hydraulic pressure thereof and is dimensioned such that it corresponds to a defined lower limit load pressure p_low of the swing arm cylinder 22. An input connection 84 of the lower pressure compensator 60 is hydraulically connected to the control input 82 thereof. Depending on the switching position of the lower pressure compensator 60, the input connection 84 thereof and the output connection 64 can be hydraulically connected to one another.

The lower limit load pressure p_low is determined from the following equation:

$$P\_low = ((D\_rod/D\_piston)^2 \cdot p\_high) - p\_k2,$$

where D_rod is the rod diameter of a piston rod 86 of the swing arm cylinder 22, D_piston is the piston diameter of a piston 88 of the swing arm cylinder 22 and p_k2 is a pressure constant. The pressure constant p_k2 of the lower pressure compensator 60 is 1 bar or several bar, more particularly it may have a value of between 3 bar to 8 bar.

The operation of the switching arrangement 50 will be described below. In FIGS. 3a and 3b, the swing arm cylinder 22 is being extended during a lifting movement of the front loader 14, i.e., the piston rod 86 is being extended in an extension direction 90. A force F (intrinsic weight of the swing arm 18, the load 28, etc.) acts contrary to the extension direction 90. The hydraulic controller 44 in FIG. 3a is accordingly in its "extend cylinder" operating or switching position. The current load pressure p_L of the swing arm cylinder 22 is less in FIG. 3a than the defined upper limit load pressure p_high at the upper pressure compensator 58. Under the hydraulic conditions according to FIG. 3a, the switching valve unit 52 is in the short-circuited switching position thereof, i.e., the two cylinder chambers 36, 38, or the two hydraulic connections 32, 34, are hydraulically short-circuited. The upper pressure compensator 58 and the auxiliary valve unit 56 are each in a specific switching position that ensures that approximately the current load pressure p_L of the swing arm cylinder 22 is present at the control input 54 of the switching valve unit 52. The hydraulic pressure at the control input 54 is therefore greater than the sum of the minimum restoring pressure p_min and the lower of the two hydraulic pressures in the line sections 74, 76. The restoring pressure p_min is dimensioned such that it is somewhat greater than the largest possible back pressure p_B occurring in the piston chamber 36 (FIG. 6). The switching valve unit 52, or the switching arrangement 50, thus remains in the short-circuited position for a load pressure p_L<p_high. Therefore it is necessary for considerably less hydraulic medium to be delivered by the pump 46, and the movements of the swing arm cylinder 22 can be faster. The movement processes of the front loader 14 are correspondingly more efficient.

Due to the short-circuited switching position in FIG. 3a, however, the cross-sectional area of the piston rod 86, and not the cross-sectional area of the piston 88, forms the effective pressure surface area. With an increasing force F, the load pressure p_L can rapidly increase and reach the maximum working pressure p_pump_max of the pump 46. This would impair the movement process of the front loader 14. To avoid this, the upper pressure compensator 58 is dimensioned such that it switches into its switching position according to FIG. 3b as soon as an increasing current load pressure p_L reaches or exceeds the value p_high. The control pressures at the control inputs 54 and 66 of the switching valve unit and 52 and the auxiliary valve unit 56 are then substantially equal. At this point in time, the lower pressure compensator 60 will have already assumed its other switching position according to FIG. 3b, because p_low<p_high. Because the control pressures at the control inputs 54, 66 are then equal, the restoring pressure p_min can transfer the switching valve unit 52 into its separated switching position according to FIG. 3b.

Proceeding from the switching position of the switching arrangement 50 according to FIG. 3b, the force acting on the swing arm cylinder 22 and thus also the current load pressure p_L can again decrease. As soon as the inequality p_L<p_high is satisfied, the upper pressure compensator 58 is transformed back into its switching position according to FIG. 3a. This initially has no effect on the switching valve unit 52. As soon as the further decreasing current load pressure p_L also satisfies the inequality p_L<p_low, however, the lower pressure compensator 60 is also transferred back into its switching position according to FIG. 3a. Then, approximately the current load pressure p_L, which is greater than the control pressure at the control input 66 of the auxiliary valve unit 56 and the minimum restoring pressure p_min, is present at the control input 54 of the switching valve unit 52. Consequently, the switching valve unit 52 is transferred back into its short-circuited switching position according to FIG. 3a.

In FIGS. 4a and 4b, the swing arm cylinder 22 is being retracted during a lowering movement of the front loader 14, i.e., the piston rod 86 is being retracted in a retraction direction 92. A force F (intrinsic mass of the swing arm 18, load 28, etc.) acts on the swing arm cylinder 22. Accordingly, the hydraulic controller 44 is in its "retract cylinder" operating or switching position in FIG. 4a. The current load pressure p_L of the swing arm cylinder 22 is less in FIG. 4a than the defined upper limit load pressure p_high at the upper pressure compensator 58. Under the hydraulic conditions according to FIG. 4a, the switching valve unit 52 is in the short-circuited switching position thereof, i.e., the two cylinder chambers 36, 38, or the two hydraulic connections 32, 34, are hydraulically short-circuited. With increasing force F and correspondingly increasing current load pressure p_L in the piston chamber 36, or at the hydraulic connection 32, the mode of operation of the switching arrangement 50 is analogous to that described with relation to FIGS. 3a and 3b. As soon as the load pressure p_L reaches or exceeds the value p_high, the switching valve unit 52 is consequently returned to its separated switching position (FIG. 4b). If the current load pressure p_L again decreases and falls below the value p_low, the switching valve unit 52 returns to its short-circuited switching position according to FIG. 4a.

In FIG. 5, the swing arm cylinder 22 or the piston rod 86 thereof is being extended in the extension direction 90. An external force F impinging on the swing arm cylinder 22 is likewise acting in the extension direction 90. This is the case, among others, if the tractor 10, having been raised by means of the front loader 14 in order to smooth the ground by means of a shovel attached to the swing arm 18, is again lowered completely onto the ground. Accordingly, the hydraulic controller 44 is in its "extend cylinder" operating or switching position in FIG. 5. The pump 46 is delivering hydraulic medium at the hydraulic connection 32 in the direction of the swing arm cylinder 22. The pump pressure is less than the correspondingly defined minimum restoring pressure p_min at the auxiliary valve unit 56. Under the hydraulic conditions according to FIG. 5, the switching valve unit 52 is in the separated switching position, i.e., the two cylinder chambers 36, 38, or the two hydraulic connections 32, 34, are hydraulically separated from one another. The lower pressure compensator 60 and the auxiliary valve unit 56 ensure with their specific switching positions that approximately the pump pressure that corresponds to the pressure p_B of the swing arm cylinder 22 is present at the control input 54 of the switching valve unit 52. As long as p_B<p_min, the switching valve unit 52, or the switching arrangement 50, remains in the separated switching position. If the pump pressure increases, then the lower of the two hydraulic pressures in the two line sections 74, 76 also increases until the pump pressure is also present at the control input 66. Therefore the pump pressure is present at both control inputs 54 and 66 of the switching valve unit 52, and the restoring pressure p_min keeps the switching valve unit 52 reliably in the separated switching position, independently of whether the force F is increasing or decreasing.

In FIG. 6, the swing arm cylinder 22, or the piston rod 86 thereof, is being retracted in the retraction direction 92. An external force F impinging on the swing arm cylinder 22 also acts in the retraction direction 92. This is the case, for example, if a shovel attached to the front loader 14 or the swing arm 18 thereof is pressed against the ground in order to smooth it. In FIG. 6, the hydraulic controller 44 is accordingly in the "retract cylinder" operating or switching position. The back pressure p_B, which is always smaller than the minimum restoring pressure p_min at the auxiliary valve unit 56, is present at the hydraulic connection 32. Analogously to the description relating to FIG. 5, the switching arrangement 50 assumes the separated switching position and remains reliably in the separated switching position under any back pressure p_B, independently of whether the force F increases or decreases.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A utility vehicle having a front loader, comprising:
an installation base for mounting the front loader on the utility vehicle;
a swing arm arranged in an articulated manner on the installation base;
a swing arm cylinder supported on the installation base and on the swing arm, the swing arm cylinder configured as a double-acting lifting cylinder having two hydraulic connections via which the swing arm cylinder is connected to working connections of a hydraulic controller, where the hydraulic controller is connected to a hydraulic pump and a hydraulic tank for containing a hydraulic medium;

wherein, a hydraulic switching arrangement comprises different switching positions connected between the two hydraulic connections of the swing arm cylinder and the hydraulic controller such that in a short-circuited switching position of the hydraulic switching arrangement the two hydraulic connections of the swing arm cylinder are hydraulically connected to one another, wherein in the short-circuited switching position, the two hydraulic connections are disconnected from the hydraulic tank and the hydraulic pump conveys hydraulic medium to both of the two hydraulic connections of the swing arm cylinder, and in a separated switching position of the hydraulic switching arrangement, the two hydraulic connections of the swing arm cylinder are hydraulically separated from one another; and wherein, the hydraulic switching arrangement comprises a switching valve unit which is adjustable between the short-circuited switching position and the separated switching position, the switching valve unit comprises a hydraulic control input which is acted against by a restoring force that corresponds to a restoring pressure of the valve.

2. The utility vehicle according to claim 1, wherein, under an increasing load pressure of the swing arm cylinder, the hydraulic switching arrangement assumes the separated switching position thereof when a defined upper limit load pressure of the swing arm cylinder is reached or exceeded.

3. The utility vehicle according to claim 2, wherein the defined upper limit load pressure of the swing arm cylinder corresponds to a maximum working pressure of the pump minus a pressure constant.

4. The utility vehicle according to claim 2, wherein, under a decreasing load pressure of the swing arm cylinder, the hydraulic switching arrangement assumes its short-circuited switching position when the load pressure of the swing arm cylinder reaches or falls below a defined lower limit load pressure, wherein the defined lower limit load hydraulic pressure is less than the defined upper limit load hydraulic pressure.

5. The utility vehicle according to claim 4, wherein the defined lower limit load pressure is a function of $$p\_low=((D\_rod/D\_piston)^2 \cdot p\_high)-p\_k2,$$

where p_low is the defined lower limit load pressure, D_rod is the diameter of a piston rod of the swing arm cylinder, D_piston is the diameter of a piston of the swing arm cylinder, p_high is the defined upper limit load pressure and p_k2 is a pressure constant.

6. The utility vehicle according to claim 1, wherein the hydraulic switching arrangement comprises a pressure compensator that is adjustable between different switching positions, the pressure compensator comprising:
a control input hydraulically connected to a hydraulic connection of the swing arm cylinder;
an output connection hydraulically connectable to the control input of the switching valve unit; and
a restoring force corresponding to the defined upper limit load hydraulic pressure of the swing arm cylinder and acts against the control input of the upper pressure compensator.

7. The utility vehicle according to claim 6, further comprising an input connection of the upper pressure compensator is hydraulically connected to the control input thereof, wherein the input connection and the output connection of the upper pressure compensator are hydraulically connected to one another depending on the switching position of the upper pressure compensator.

8. The utility vehicle according to claim 1, wherein the hydraulic switching arrangement comprises a lower pressure compensator adjustable between different switching positions, the lower pressure compensator comprising:
a control input hydraulically connected to a hydraulic connection of the swing arm cylinder;
an output connection hydraulically connected to the control input of the switching valve unit; and
a restoring force corresponding to the defined lower limit load pressure of the swing arm cylinder and acting against the control input of the lower pressure compensator.

9. The utility vehicle according to claim 8, further comprising an input connection of the upper pressure compensator hydraulically connected to the control input thereof, wherein the input connection and the output connection of the lower pressure compensator are hydraulically connected to one another depending on the switching position of the lower pressure compensator.

10. The utility vehicle according to claim 1, wherein, based on the switching position, the hydraulic switching arrangement comprises a switchable auxiliary valve unit that comprises a separable hydraulic connection between the output connection of the upper pressure compensator or an output connection of the lower pressure compensator.

11. The utility vehicle according to claim 1, wherein, based on the switching position, the hydraulic switching arrangement comprises a switchable auxiliary valve unit that comprises the control input of the switching valve unit.

12. The utility vehicle according to claim 1, wherein the hydraulic switching arrangement comprises a switchable auxiliary valve unit mechanically coupled to the switching valve unit, and is subjected to a restoring force that corresponds to the restoring pressure and acts against the control input of the switching valve unit.

13. The utility vehicle according to claim 1, wherein the restoring pressure acting against the control input of the switching valve unit is greater than a back pressure of the swing arm cylinder.

14. A utility vehicle having a front loader, comprising:
an installation base for mounting the front loader on the utility vehicle;
a swing arm arranged in an articulated manner on the installation base;
a hydraulic pump;
a hydraulic controller connected to the hydraulic pump;
a swing arm cylinder supported on the installation base and on the swing arm, the swing arm cylinder having two hydraulic connections via which the swing arm cylinder is connected to a plurality of connections of the hydraulic controller; and
a hydraulic switching arrangement comprising different switching positions connected between the two hydraulic connections of the swing arm cylinder and the hydraulic controller such that the two hydraulic connections of the swing arm cylinder are hydraulically connected to one another in a short-circuited switching position of the hydraulic switching arrangement, wherein in the short-circuited switching position, the two hydraulic connections are disconnected from the hydraulic tank and the hydraulic pump conveys hydraulic medium to both of the two hydraulic connections of the swing arm cylinder, and the two hydraulic connections of the swing arm cylinder are hydraulically separated from one another in a separated switching position of the hydraulic switching arrangement;
wherein, under an increasing load pressure of the swing arm cylinder, the hydraulic switching arrangement assumes the separated switching position thereof when in response to a defined upper limit load hydraulic pressure of the swing arm cylinder is being reached or exceeded;
wherein, the defined upper limit load hydraulic pressure of the swing arm cylinder corresponds to a maximum working pressure of the pump minus a pressure constant;
wherein, under a decreasing load pressure of the swing arm cylinder, the hydraulic switching arrangement assumes its short-circuited switching position when the load pressure of the swing arm cylinder reaches or falls below a defined lower limit load hydraulic pressure, wherein the defined lower limit load hydraulic pressure is less than the defined upper limit load hydraulic pressure.

15. A utility vehicle having a front loader, comprising:
an installation base for mounting the front loader on the utility vehicle;
a swing arm arranged in an articulated manner on the installation base;
a swing arm cylinder supported on the installation base and on the swing arm, the swing arm cylinder configured as a double-acting lifting cylinder having two hydraulic connections via which the swing arm cylinder is connected to working connections of a hydraulic controller, where the hydraulic controller is connected to a hydraulic pump and a hydraulic tank for containing a hydraulic medium;
wherein, a hydraulic switching arrangement comprises different switching positions connected between the two hydraulic connections of the swing arm cylinder and the hydraulic controller such that in a short-circuited switching position of the hydraulic switching arrangement the two hydraulic connections of the swing arm cylinder are hydraulically connected to one another, wherein in the short-circuited switching position, the two hydraulic connections are disconnected from the hydraulic tank and the hydraulic pump conveys hydraulic medium to both of the two hydraulic connections of the swing arm cylinder, and in a separated switching position of the hydraulic switching arrangement, the two hydraulic connections of the swing arm cylinder are hydraulically separated from one another; and
wherein, under an increasing load pressure of the swing arm cylinder, the hydraulic switching arrangement assumes the separated switching position thereof in response to a defined upper limit load hydraulic pressure of the swing arm cylinder being reached or exceeded.

16. The utility vehicle according to claim 15, wherein the defined upper limit load hydraulic pressure of the swing arm cylinder corresponds to a maximum working pressure of the pump minus a pressure constant.

17. The utility vehicle according to claim 15, wherein, under a decreasing load pressure of the swing arm cylinder, the hydraulic switching arrangement assumes its short-circuited switching position when the load pressure of the swing arm cylinder reaches or falls below a defined lower limit load hydraulic pressure, wherein the defined lower limit load hydraulic pressure is less than the defined upper limit load hydraulic pressure.

18. The utility vehicle according to claim 17, wherein the defined lower limit load pressure is a function of $$p\_low = ((D\_rod/D\_piston)^2 \cdot p\_high) - p\_k2,$$

where p_low is the defined lower limit load pressure, D_rod is the diameter of a piston rod of the swing arm cylinder, D_piston is the diameter of a piston of the swing arm cylinder, p_high is the defined upper limit load pressure and p_k2 is a pressure constant.

* * * * *